(12) United States Patent
Lambrache et al.

(10) Patent No.: US 7,752,427 B2
(45) Date of Patent: Jul. 6, 2010

(54) STACK UNDERFLOW DEBUG WITH STICKY BASE

(75) Inventors: Emil Lambrache, Campbell, CA (US); Benjamin F. Froemming, San Jose, CA (US)

(73) Assignee: Atmel Corporation, San Jose, CA (US)

( * ) Notice: Subject to any disclaimer, the term of this patent is extended or adjusted under 35 U.S.C. 154(b) by 18 days.

(21) Appl. No.: 11/298,155

(22) Filed: Dec. 9, 2005

(65) Prior Publication Data
US 2007/0136565 A1 Jun. 14, 2007

(51) Int. Cl.
*G06F 7/38* (2006.01)
(52) U.S. Cl. .................... 712/244; 712/202
(58) Field of Classification Search .......... 712/244, 712/202
See application file for complete search history.

(56) References Cited

U.S. PATENT DOCUMENTS

| | | | | |
|---|---|---|---|---|
| 4,183,096 A * | 1/1980 | Cenker et al. | ........... | 365/222 |
| 4,525,780 A * | 6/1985 | Bratt et al. | ........... | 711/163 |
| 4,884,244 A * | 11/1989 | Brewer | ........... | 365/240 |
| 4,967,375 A * | 10/1990 | Pelham et al. | ........... | 345/564 |
| 4,985,825 A * | 1/1991 | Webb et al. | ........... | 711/169 |
| 5,107,457 A * | 4/1992 | Hayes et al. | ........... | 711/132 |
| 5,255,359 A * | 10/1993 | Ebbers et al. | ........... | 345/642 |
| 5,560,036 A | 9/1996 | Yoshida | ........... | 395/800 |
| 5,640,582 A * | 6/1997 | Hays et al. | ........... | 712/38 |
| 5,694,589 A | 12/1997 | Glew et al. | ........... | 395/568 |
| 5,812,830 A * | 9/1998 | Naaseh-Shahry et al. | ... | 713/400 |
| 5,950,221 A * | 9/1999 | Draves et al. | ........... | 711/100 |
| 5,953,529 A * | 9/1999 | Kato | ........... | 717/135 |
| 6,006,323 A * | 12/1999 | Ma et al. | ........... | 712/202 |
| 6,081,665 A * | 6/2000 | Nilsen et al. | ........... | 717/116 |
| 6,167,504 A * | 12/2000 | Damron | ........... | 712/202 |
| 6,578,094 B1 * | 6/2003 | Moudgill | ........... | 710/57 |
| 6,651,159 B1 * | 11/2003 | Ramesh et al. | ........... | 712/209 |
| 6,826,675 B1 * | 11/2004 | Tormey et al. | ........... | 712/202 |

(Continued)

OTHER PUBLICATIONS

Computer Architecture: A Quantitative Approach, 2nd Edition, Chapter 3—pipelining by David A Patterson and John L Hennessy with a contribution by David Goldberg and Xerox Palo Alto Research Center; Morgan Kaufman Publishers, Inc, Jan. 1996.*

*Primary Examiner*—Eddie P Chan
*Assistant Examiner*—Idriss N Alrobaye
(74) *Attorney, Agent, or Firm*—Schwegman, Lundberg & Woessner, P.A.

(57) ABSTRACT

A stack pointer is copied to a stack pointer base to debug stack underflow. A move instruction, used to initialize the stack pointer, is modified to additionally copy the stack pointer to a stack pointer base register. During a course of execution in a single context, the stack pointer base sticks to the initial base value while the stack pointer is altered by a succession of PUSH and POP instructions. By monitoring for equivalence in the stack pointer and the stack pointer base values, a balanced number of PUSH and POP instructions is detected. If an equal number of PUSH and POP instructions is detected and an additional POP instruction is programmed, a stack underflow condition exists, an exception condition signaled, and exception flag produced. The exception condition allows the stack to be protected from an excessive POP instruction retrieving data out of context and subsequent loss of stack data.

14 Claims, 3 Drawing Sheets

U.S. PATENT DOCUMENTS

| | | | |
|---|---|---|---|
| 6,904,513 B1 * | 6/2005 | Tormey et al. | 712/202 |
| 6,925,552 B2 * | 8/2005 | Reilly et al. | 712/244 |
| 7,181,733 B2 * | 2/2007 | Sarcar | 717/140 |
| 7,200,741 B1 * | 4/2007 | Mine | 712/244 |
| 2002/0144235 A1 * | 10/2002 | Simmers et al. | 717/124 |
| 2003/0046614 A1 | 3/2003 | Brokish | 714/38 |

* cited by examiner

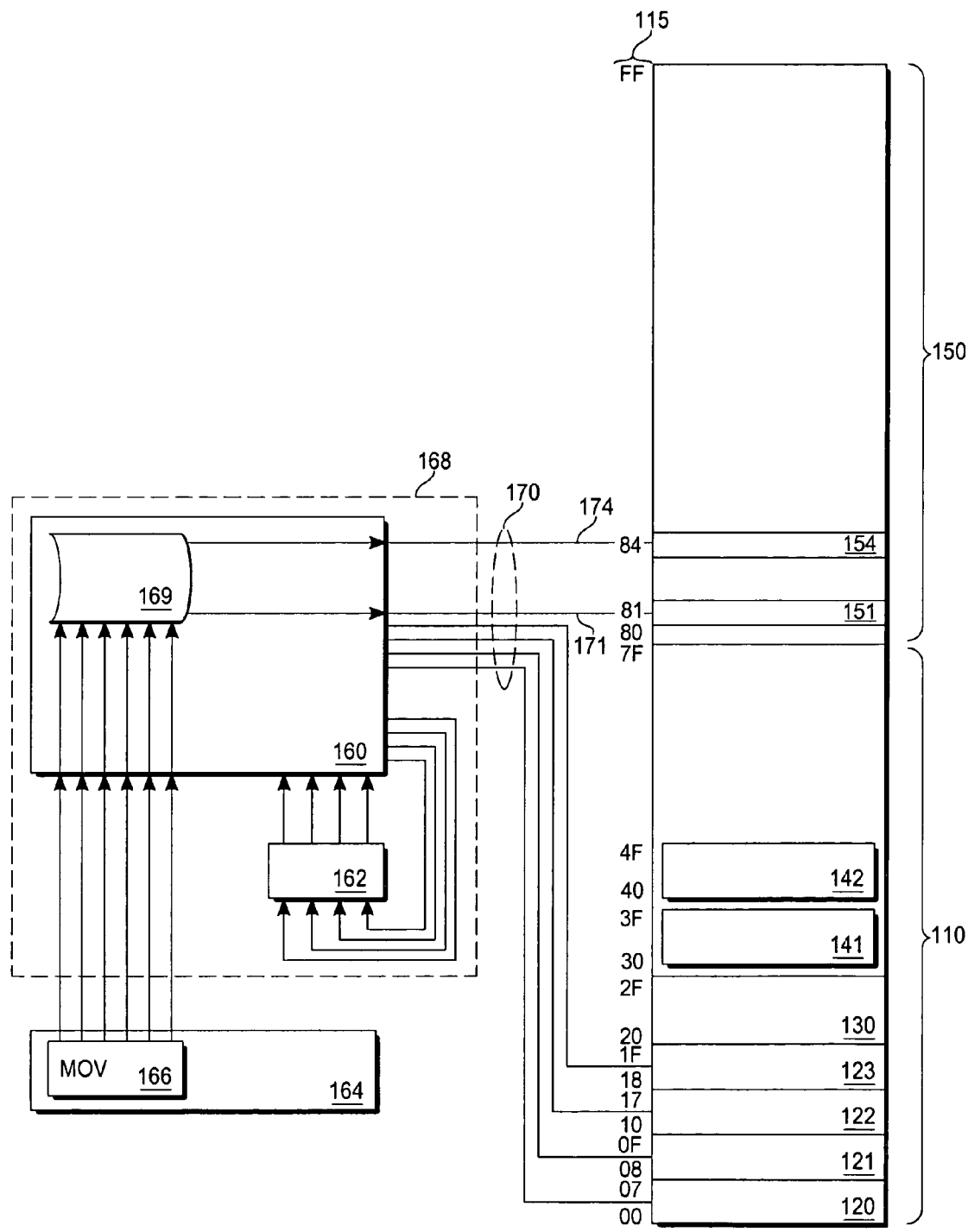
Fig._1

| 201 ~ { INST | MOV SP,#4FH | PUSH₁ | PUSH₂ | POP₁ | POP₂ | POP₃ |
|---|---|---|---|---|---|---|
| 202 ~ { SP | 4FH | 50H | 51H | 50H | 4FH | <4EH> |
| 203 ~ { SPB | 4FH | 4FH | 4FH | 4FH | 4FH | 4FH |
Fig._2
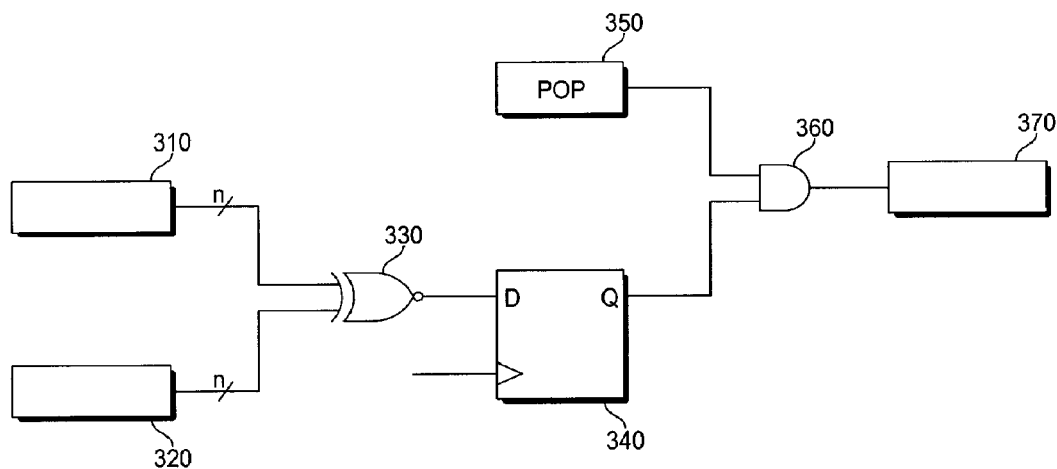
Fig._3

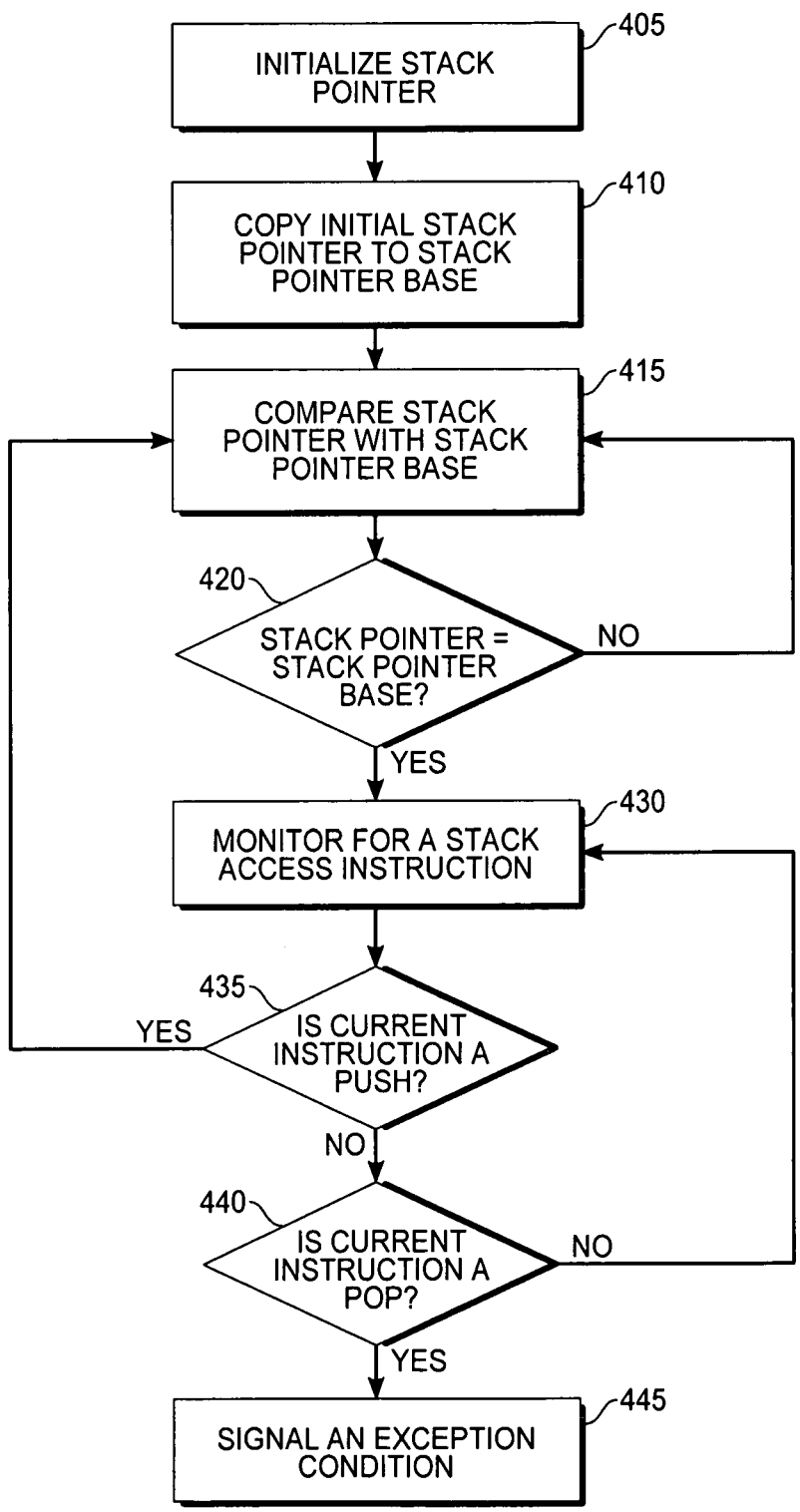
Fig._4

STACK UNDERFLOW DEBUG WITH STICKY BASE

TECHNICAL FIELD

The present invention relates generally to maintaining a stack pointer across procedure calls in a computing unit. More specifically, the present invention relates to the use of a register for storing a copy of an original stack pointer location and monitoring stack accesses to make notification when stack underflow beyond the original stack pointer location occurs.

BACKGROUND ART

Applications running on computer systems typically invoke multiple processes in a course of execution. Within a program, one process may call another or call itself (in recursion) in order to effect program execution. A stack is an area of memory allocated to last-in-first-out (LIFO) accesses of state information. As one process switches to another, the state of a first process is saved to preserve an operational context before switching to a new context for a called process. An operational context may be composed of return addresses, values in general purpose or special purpose registers, parameters, automatic variables or data generated in the execution of a process. A plurality of context values constitute a state of a machine and are quantities required by an executing process up to a point that another process is called. A case where a first process calls another, where the operational state of the calling process is saved to a stack, is termed context switching. A storage structure defined in memory for capturing all of the operational quantities associated with the execution state of a machine is termed an activation record or a stack frame.

After being called, a newly executing process may have need to store and retrieve certain data or parameters to and from stack memory during the course of execution. PUSH and POP instructions are used to store and retrieve respectively. Data transactions brought about by the PUSH and POP instructions are carried out in general memory within the stack. Some stacks progress within upper memory from high locations to lower locations and therefore grow down in memory addresses during use. In the case of a grow-down stack, the top of the stack moves lower in memory locations as data is stored and retrieved.

In order for a called process to maintain execution within a portion of memory appropriate to a present execution context, a number of PUSH instructions executed is greater than or equal to the number of POP instructions. In an executing program a new context is formed at a procedure call. After storing a stack frame, as may be required after the context switch, a next stack memory access is due to a PUSH instruction in typical operation. Data is put into the stack before any retrieval is performed. Additionally, the number of POP instructions does not exceed the number of PUSH instructions or else an excessive number of POP instructions pull data from a prior context or from relating memory to a different process. An excessive number of POP instructions also updates a pointer to a next writable stack location (i.e. a stack pointer) and opens an opportunity for data from another context to be overwritten. In a case where more PUSH instructions are executed than there is memory space allotted to stack storage, an access out of range for the stack memory or a wrap around condition may result. Generally, in most processors, the out of range condition or memory wrap is called a stack overflow. A stack overflow triggers an exception condition and may cause execution to jump to a debug monitor routine to resolve a cause of the problem condition.

To explain the operation of PUSH and POP instructions, a PUSH instruction increments the stack pointer by 1. Next, the contents of a variable indicated directly in a PUSH instruction are copied into an internal RAM location addressed by the stack pointer. Operationally the PUSH instruction is:

PUSH (onto stack):
(SP) ← (SP)+1
((SP)) ← (direct)
where the symbology is defined as:
← ... is replaced by ...
( ... ) the contents of ...
(( ... )) the data pointed to by ...
direct the value (variable) referenced directly in the instruction A POP instruction retrieves the contents of the internal RAM location addressed by the stack pointer and the stack pointer is decremented by 1. The value retrieved is transferred to a directly addressed byte indicated in the instruction. Operationally the POP instruction is:

POP (from stack):
(direct) ← ((SP))
(SP) ← (SP)−1

Proper stack maintenance is crucial to correct execution of a program and for correct transactions involving operands. In view of a general capability existing to handle stack overflow, what is needed is an approach to stack underflow that is economical, transparent to a user, and allows for debug operations to be triggered and traced from an underflow occurrence.

SUMMARY

In a microprocessor-based system, an application may, in a course of operation, make many procedure calls where any one of the procedures may in turn call other procedures or the calling procedure in recursion. Stack usage becomes important in view of retaining state information in a context switch that occurs at each procedure call. Stack overflow is treated typically by an exception condition and may possibly trigger a debug monitor to handle the resolution of a problem causing the condition. In practice, a present capability in monitoring for a stack overflow condition does not have a robust equivalent in detect of underflow conditions.

A stack pointer base register is used to capture the stack pointer (value) at initialization of the stack. For example, the present invention modifies a stack initialization instruction to copy the stack pointer to the stack pointer base register when the stack initializing instruction is given. Such an initializing instruction is MOV SP, #31H (which sets the stack pointer contents to point to a location of 31H (H denoting hexidecimal notation)). After the stack setup, the running procedure may execute many PUSH and POP commands storing and retrieving additional information to and from the stack. PUSH and POP operands increment and decrement the SP register to keep track of the top of the stack. The PUSH and POP operands do not affect the stack pointer base register however. In this way a record is kept of what location the most recent assignment of the stack starting location is set to. This means the start of the stack in the present context is preserved in the stack pointer base register.

In a case where more POP instructions are executed than PUSH instructions or where some other manipulation of the stack occurs, the microprocessor may detect initiation of a stack underflow condition, which triggers an exception condition. The microprocessor causes execution to jump to a debug monitor to determine a problem cause, prevents information from being located below a valid stack pointer location, and prevents an over-writing of valid data. By detection of a present stack pointer location equaling the stack pointer base (i.e., the content of the stack pointer base register) a monitoring condition is started to detect any further POP instruction and prevent execution of an excessive POP instruction from retrieving inappropriate data and preventing a possibility of valid data being over-written by a subsequent update of the stack pointer.

By extending an instruction that sets the stack pointer location to also copy an initial stack pointer location to a new stack pointer base register and by monitoring any Pop instruction exceeding a valid stack pointer base value, stack pointer underflow is avoided and an appropriate debug solution may be invoked. An economical and user-transparent treatment of stack underflow is achieved.

BRIEF DESCRIPTION OF DRAWINGS

FIG. 1 is an exemplary memory map diagram for a processor system incorporating stack underflow debug in accordance with the present invention.

FIG. 2 is an exemplary PUSH/POP instruction sequence diagram incorporating stack underflow debug for use with the memory map of FIG. 1.

FIG. 3 is an exemplary symbolic logic diagram of a comparison of a stack pointer with a stack pointer base for underflow detection for use with the memory map of FIG. 1.

FIG. 4 is a process flow diagram of a method of detecting stack underflow for use with the memory map of FIG. 1.

DETAILED DESCRIPTION

With reference to FIG. 1, a general purpose RAM 110 and special function registers 150 comprise a general memory in an exemplary memory map diagram for a processor system incorporating stack underflow debug in accordance with the present invention. Byte addresses 115 are used to access locations of the general purpose RAM 110 and the special function registers 150. Commencing with byte addresses 00H-07H the lowest addresses of the general purpose RAM 110 are a default register bank 120. A first set of eight registers R0-R7 are located in the default register bank 120. The three memory banks memory_bank_1 121, memory_bank_2 122, and memory_bank_3 123 are located in byte address ranges 08H-0FH, 10H-17H, and 18H-1FH, respectively. Byte addresses 20H-2FH are bit-addressable locations and byte addresses 30H-7FH are general purpose memory. A stack_frame_1141 and a stack_frame_2 142 are located in low addresses in the general purpose RAM 110 at byte address ranges 30H-3FH and 40H-4FH respectively.

The special function registers 150 are located in byte addresses 80H-FFH. A stack pointer register 151 is located at byte address 81H and a stack pointer base register 154 is located at byte address 84H. The special function registers 150 also include communication port registers, program status word, timer registers, and interrupt registers (not shown) for example.

A combinatorial control logic block 160 is coupled with a state register 162 to form a microprogram controller 168. An instruction register 164 couples through a plurality of bitlines to the combinatorial control logic block 160. The microprogram controller 168 couples to the general purpose RAM 110 and the special function registers 150 through a plurality of datapath control lines 170. A stack-pointer-datapath-control line 171 and a stack-pointer-base-datapath-control line 174 are two of the datapath control lines 170 that couple to the stack pointer register 151 and the stack pointer base register 154, respectively, within the special function registers 150.

To implement the present invention, a move instruction to initialize stack memory (i.e., a destination is the stack pointer register 151) is present in the instruction register 164 during program execution. The move instruction is the same as found in typical programming and may be a move instruction from existing code. No modification of the move instruction in a programmer's realm is necessary for the present invention to work. A move opcode MOV is present in an opcode field 166 as part of the move instruction in the instruction register 164. The opcode field 166 is coupled to a move instruction microprogram 169 within the combinatorial control logic block 160.

The move instruction microprogram 169 is a modification of a typical move instruction microprogram (not shown) in that when the destination of the move instruction is the stack pointer register 151, the stack pointer (i.e., the [source] argument of the move instruction) is also copied to the stack pointer base register 154. The move opcode MOV present in the opcode field 166 is propagated to the move instruction microprogram 169. The move instruction microprogram 169 decodes the move opcode MOV and asserts signaling to implement the move of the stack pointer and the copying to the stack pointer base. The move instruction microprogram 169 activates signals on a stack-pointer-datapath-control line 174 and a stack-pointer-base-datapath-control line 174 to effect the exemplary move instruction of the present invention.

With reference to FIG. 2, an instruction sequence 201 begins with an exemplary move instruction MOV SP, #4FH in an exemplary PUSH/POP instruction sequence. Within the exemplary move instruction MOV is a move opcode, SP is a symbol representing the stack pointer register 151, and the # sign denotes a value to be interpreted as a number. The move instruction MOV SP, #4FH initializes the stack pointer to 4FH in a first stage of a stack pointer sequence 202 corresponding to the instruction sequence 201. The stack pointer sequence 202 indicates the value of the stack pointer after a corresponding instruction is executed. The stack pointer register 151 (FIG. 1), at byte address 81H, contains the value 4FH. The stack pointer +1 (50H) is the address where a next entry in a stack maybe placed by a stack storage instruction such as a PUSH instruction for example. The address 50H is the next available memory location in the general purpose RAM 110 above the stack_frame_2 142.

The operation of the PUSH instruction, explained supra, explains why the move instruction MOV SP, #4FH works to provide the location 50H as the first available stack location above the stack_frame_2 142 (FIG.1) for a subsequent PUSH instruction. A PUSH instruction is defined to increment-before-access and a POP instruction is defined to decrement-after-access. Access to the stack memory by any instruction other than a POP or PUSH instruction within the present execution context upsets a balance between the two instruction types and prohibits proper stack underflow detection.

In a stack pointer base sequence 203 the stack pointer base, which is the content of the stack pointer base register 154 at byte address 84H (FIG. 1), also receives the value 4FH at an initiation of the stack pointer with the exemplary move instruction MOV SP, #4FH. The exemplary move instruction MOV SP, #4FH is constructed to place the argument (i.e., 4FH) into the stack pointer register 151 and the stack pointer base register 154 in a single operation, thus avoiding having a programmer explicitly incorporate separate instructions to initialize and maintain the stack pointer base.

Subsequently, in the execution of program code, a first PUSH instruction $PUSH_1$ is executed. Operation of the first PUSH instruction $PUSH_1$ increments the stack pointer to 50H and places data at a location in general purpose RAM 110 (FIG. 1) with byte address 50H. A PUSH instruction does not alter the stack pointer base, and the value of the stack pointer base remains at 4FH. A second PUSH instruction $PUSH_2$ is executed, which increments the stack pointer to 51H within the stack pointer sequence 202 and places data at a location with byte address 51H. Again, a PUSH instruction does not alter the stack pointer base, so the value of the stack pointer base remains at 4FH.

By further example, a first POP instruction $POP_1$ follows and operation of the instruction causes data from location 51H (per the stack pointer) to be retrieved from the stack and the stack pointer is decremented to a value of 50H. In a similar manner to PUSH instructions, POP instructions do not alter the stack pointer base, so the value of the stack pointer base remains at 4FH. A second POP instruction $POP_2$ follows and operation of the instruction causes data from location 50H (per the stack pointer) to be retrieved from the stack and the stack pointer is decremented to a value of 4FH. Again, POP instructions do not alter the stack pointer base, so the value of the stack pointer base remains at 4FH.

In a continuing example of stack storage, a third POP instruction $POP_3$ follows in the instruction sequence 201. Operation of the third POP instruction $POP_3$ initiates retrieval of data from location 4FH (per the stack pointer) and causes the stack pointer to be decremented to a value of 4EH if allowed to execute. If operation of the third POP instruction $POP_3$ is allowed to be carried out, a last location of stack_frame_2 142 is retrieved and the contents of the last location of stack_frame_2 142 is lost on retrieval and written-over by a subsequent stack storage instruction. A situation such as the execution of the third POP instruction $POP_3$ is an example of stack underflow caused by an excessive number of POP instructions compared to PUSH instructions.

In order to avoid stack underflow, for example, a comparison is made between the stack pointer and the stack pointer base in an on-going basis from one instruction execution to another. To make stack underflow avoidance possible, a comparator circuit, discussed infra, maintains a monitoring of equivalence between the stack pointer register 151 (FIG. 1) and the stack pointer base register 154. On detection of a subsequent POP instruction after an equivalence between the stack pointer register 151 and the stack pointer base register 154, an exception condition is generated which halts operation of the third POP instruction $POP_3$ before retrieval or corruption of a location inappropriate to a present context of execution. The inappropriate location is preserved and a debugger may be invoked or a special monitor mode started. In a complex program execution situation, with multiple non-contiguous stack spaces, the stack pointer is reinitialized many times. To make use of stack underflow detection and debug with the present invention, a programmer maintains a prior stack pointer base across procedure calls. To initiate a new stack memory area, in present practice, the programmer saves a just prior stack pointer before initializing a new stack pointer. To continue stack underflow detection, the programmer also saves the stack pointer base corresponding to the just prior stack memory area. The stack pointer base is saved, for example, by the called procedure using a PUSH instruction with the stack pointer base as operand.

To restore the just prior stack memory area, the called procedure restores the stack pointer with a move instruction. The move instruction copies, per the present invention, the stack pointer value to the stack pointer base. The stack pointer value copied is the top of the just prior stack memory area and is not a proper base value for the stack memory area being returned to. The programmer POPs a corresponding stored stack pointer base to correctly update a proper value of stack, pointer base for a present stack memory area. The programmer maintains the stack pointer base across the multiple non-contiguous stack spaces in exchange for the stack underflow detection and debug capabilities of the present invention.

With reference to FIG. 3, a stack pointer register 310 and a stack pointer base register 320 are compared in an exemplary symbolic logic diagram of underflow detection. The stack pointer register 310 and the stack pointer base register 320 connect to a comparator exemplified by an exclusive NOR gate 330. Contents of the two registers are compared within each instruction execution cycle. Detection of equivalence of the contents of each register produces a high logic level at an output of the exclusive NOR gate 330 which is clocked into a latch 340 in a corresponding instruction cycle. The high logic level at the output of the exclusive NOR gate 330 indicates that an equal number of PUSH instructions and POP instructions have been executed.

On a subsequent instruction cycle a POP instruction POP occurs in an instruction register 350 during continuing execution. A high logic level signal from the instruction register 350 is combined with a high logic level from a Q output of the latch 340 in an AND gate 360. An AND function of the equivalence signal (coming from the latch 340) with the POP instruction signal (from the instruction register 350) indicates an excessive POP instruction occurs after a previous POP instruction returns the stack pointer to the initial stack pointer value. An output of the AND gate 360 produces an exception condition in a condition flag register 370. The excessive POP instruction is detected by the comparator circuit, stack coherence is maintained, and an exception condition is triggered to induce debug capabilities for stack underflow or invoke a monitor condition.

With reference to FIG. 4, an initializing 405 of a stack pointer step commences a process flow diagram of detecting stack underflow. A subsequent step is copying 410 the initial stack pointer to the stack pointer base followed by comparing 415 the stack pointer with the stack pointer base. A next step is determining 420 if the stack pointer and the stack pointer base are equal. If the stack pointer and the stack pointer base are not equal, the comparing 415 of the stack pointer with the stack pointer base continues. If the stack pointer and the stack pointer base are equal, the method continues with monitoring 430 for a stack memory access instruction.

The method continues with determining 435 if a current instruction is a PUSH instruction. If the current instruction is a PUSH instruction comparing 415 of the stack pointer with the stack pointer base continues. Otherwise the current instruction is not a PUSH instruction and the process continues with determining 440 if a current instruction is a POP instruction. If the current instruction is not a POP instruction, the process continues with the step of monitoring 430 for a stack memory access instruction. If the current instruction is a POP instruction, the process completes by signaling 445 an exception condition.

In this way execution of PUSH and POP instructions is monitored for both the number of POP instructions equaling the number of PUSH instructions and the number of POP instructions exceeding the number of PUSH instructions. If the number of POP instructions exceeds the number of PUSH instructions, then stack underflow has been detected and the exception signal may, for example, trigger a debug mode.

An additional stack pointer base register 154 (FIG. 1) has been presented which receives an initial stack pointer value provided by a modified move instruction. The move instruction initializes the stack pointer and creates a stack pointer base at system startup and at each context switch which may have an accompanying new stack memory area. In each execution context the stack pointer base sticks to an initialized value while the stack pointer is altered by a sequence of PUSH instructions and POP instructions. The stack pointer base maintains the original location of valid stack memory for a present execution context. The stack pointer base and stack pointer are continually compared.

If after initialization, the stack pointer base and stack pointer become equal and a subsequent POP instruction is received for execution, an exception condition is produced. The exception condition provides stack memory location protection and that either a debug mode or monitor mode is entered. When more POP instructions than PUSH instructions are received for execution after the present context for the stack memory is set, the situation is flagged and debug enabled without the user having to program additional code to monitor stack underflow. In this way an economical and transparent way of preventing and debugging stack underflow is achieved.

While various portions of an exemplary comparison apparatus have been depicted with exemplary components and configurations, an artisan in the field of microprocessors and their microprogramming circuits would readily recognize alternative embodiments for accomplishing similar results. For instance, a storage element has been represented as a latch. One skilled in the art would recognize that a storage element may be realized from a master/slave flip-flop with complementary clocking of the two corresponding latch loops to allow a logic level applied to the master latch loop to program the device. A register means has been portrayed as a storage structure. A skilled artisan in the field would recognize a series of latches would attain a same storage capability. A logic gate for combining signals has been depicted as an AND gate. One skilled in the art would consider any of a number of combinatorial logic gates, such as NAND, OR, or NOR gates as being capable of combining similar input signals of various mixes of gender as being able to achieve the same logical result.

In addition, a condition flagging means has been presented as an exception register with a signaling output. One skilled in the art would readily envision a storage element capturing an appropriate logic level and producing signaling where notification of the condition is needed. A micro instruction has been portrayed as a means of assertion of datapath control signals. An artisan skilled in the field would readily recognize that combinational control logic embodied by ROMs (read only memories), PLAs (programmable logic arrays), and EEPROMs (electrically erasable programmable read only memories) would implement the same assertion of signal for datapath control. These and further changes to the structure and fabrication of the present invention are readily contemplated in light of the disclosed material. Therefore, the specification and drawings are to be regarded in an illustrative rather than a restrictive sense.

What is claimed is:

1. An apparatus comprising:
   a first register to store a stack pointer value;
   a second register to store a stack pointer base value;
   a comparator coupled to the first register and the second register to produce an equivalence signal on a determination of equivalence between the stack pointer value and the stack pointer base value during a first instruction cycle, wherein the comparator comprises an exclusive NOR gate;
   storage coupled to the comparator to store the equivalence signal;
   instruction storage to store an instruction during a subsequent instruction cycle and to produce an instruction signal when a stack memory retrieval instruction is stored; and
   combining logic coupled to the storage and to the instruction storage to combine the equivalence signal with the instruction signal and to produce a stack exception signal upon receiving an assertive logic level in both the equivalence signal and the instruction signal.

2. The apparatus of claim 1, wherein the comparator is coupled to compare contents of the first register and the second register on consecutive instruction cycles.

3. The apparatus of claim 1, wherein a high logic level produced at an output of the comparator upon production of the equivalence signal indicates that an equal number of PUSH instructions and POP instructions have been executed.

4. The apparatus of claim 1, wherein the instruction storage is configured to store a POP instruction.

5. The apparatus of claim 1, wherein a high logic level at an output of the combining logic signals an underflow condition.

6. The apparatus of claim 1, further comprising a condition-flag storage coupled to the combining logic to store the stack exception signal and to produce an exception signal upon receiving the stack exception signal.

7. The apparatus of claim 6, wherein the condition-flag storage comprises a register.

8. An apparatus comprising:
   a first register to store a stack pointer value;
   a second register to store a stack pointer base value;
   a comparator coupled to the first register and the second register to produce an equivalence signal on a determination of equivalence between the stack pointer value and the stack pointer base value during a first instruction cycle;
   storage coupled to the comparator to store the equivalence signal;
   instruction storage to store an instruction during a subsequent instruction cycle and to produce an instruction signal when a stack memory retrieval instruction is stored; and
   combining logic coupled to the storage and to the instruction storage to combine the equivalence signal with the instruction signal and to produce a stack exception signal upon receiving an assertive logic level in both the equivalence signal and the instruction signal, wherein the combining logic comprises an AND gate.

9. The apparatus of claim 8, wherein the comparator is coupled to compare contents of the first register and the second register on consecutive instruction cycles.

10. The apparatus of claim 8, wherein a high logic level produced at an output of the comparator upon production of the equivalence signal indicates that an equal number of PUSH instructions and POP instructions have been executed.

11. The apparatus of claim 8, wherein the instruction storage is configured to store a POP instruction.

12. The apparatus of claim 8, wherein a high logic level at an output of the combining logic signals an underflow condition.

13. The apparatus of claim 8, further comprising a condition-flag storage coupled to the combining logic to store the stack exception signal and to produce an exception signal upon receiving the stack exception signal.

14. The apparatus of claim 13, wherein the condition-flag storage comprises a register.

* * * * *